United States Patent
Morris

(10) Patent No.: US 10,017,170 B1
(45) Date of Patent: Jul. 10, 2018

(54) SYSTEM AND METHOD FOR PROPULSION SYSTEM CONTROL

(71) Applicant: GM GLOBAL TECHNOLOGY OPERATIONS LLC, Detroit, MI (US)

(72) Inventor: Robert L Morris, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/398,764

(22) Filed: Jan. 5, 2017

(51) Int. Cl.
*B60W 20/10* (2016.01)
*B60L 11/14* (2006.01)
*B60K 6/52* (2007.10)
*B60L 15/20* (2006.01)

(52) U.S. Cl.
CPC ............ *B60W 20/10* (2013.01); *B60K 6/52* (2013.01); *B60L 11/14* (2013.01); *B60L 15/2009* (2013.01); *B60L 2240/421* (2013.01); *B60L 2240/423* (2013.01); *B60L 2240/443* (2013.01); *B60L 2260/28* (2013.01); *B60W 2510/081* (2013.01); *B60W 2530/10* (2013.01); *B60W 2710/0666* (2013.01); *B60W 2710/083* (2013.01); *B60Y 2400/82* (2013.01); *Y10S 903/93* (2013.01)

(58) Field of Classification Search
CPC ........... B60W 20/10; B60W 2710/083; B60W 2510/081; B60W 2530/10; B60W 2710/0666; B60L 11/14; B60L 2240/421; B60L 2260/28; B60L 2240/443; B60L 2240/423; B60L 15/2009; B60Y 2400/82; B60K 6/52; Y10S 903/93

USPC ............................................................ 701/22
See application file for complete search history.

(56) References Cited

U.S. PATENT DOCUMENTS

| | | | |
|---|---|---|---|
| 6,953,409 B2 | 10/2005 | Schmidt et al. | |
| 7,577,507 B2 | 8/2009 | Morris | |
| 7,739,016 B2 | 6/2010 | Morris | |
| 8,010,263 B2 | 8/2011 | Morris | |
| 8,046,142 B2 * | 10/2011 | Morris | B60W 30/20 701/29.1 |
| 8,050,821 B2 * | 11/2011 | Morris | B60K 6/445 280/5.519 |
| 8,140,230 B2 * | 3/2012 | Haggerty | B60W 50/04 123/192.1 |
| 8,725,335 B2 | 5/2014 | Tolkacz | |
| 8,762,012 B2 | 6/2014 | Hansen et al. | |
| 9,260,105 B2 | 2/2016 | Tolkacz et al. | |
| 2005/0247503 A1 * | 11/2005 | Imazu | B60K 6/365 180/300 |

(Continued)

*Primary Examiner* — Tyler J Lee

(57) ABSTRACT

A method and system for controlling a vehicle that includes a first propulsion system with a first torque generator and coupled to a first drive member, a second propulsion system with a second torque generator and coupled to a second drive member. The method includes measuring a speed of the first drive member, estimating a speed of the first drive member using a model of the first propulsion system that includes a modeled first rotational inertia and a modeled first translational inertia that are rigidly connected to each other and a model of a first coupling between the modeled first propulsion system and a model of the second propulsion system, and comparing the measured speed of the first drive member to the estimated speed of the first drive member.

18 Claims, 4 Drawing Sheets

(56) References Cited

U.S. PATENT DOCUMENTS

2006/0293148 A1* 12/2006 Smith ............... F16D 48/06
                                              477/175
2016/0169755 A1* 6/2016 Shizu ............... G01L 3/10
                                              73/862.192

* cited by examiner

SYSTEM AND METHOD FOR PROPULSION SYSTEM CONTROL

FIELD

The present disclosure relates to a system and method for propulsion system control.

INTRODUCTION

This introduction generally presents the context of the disclosure. Work of the presently named inventor, to the extent it is described in this introduction, as well as aspects of the description that may not otherwise qualify as prior art at the time of filing, are neither expressly nor impliedly admitted as prior art against this disclosure.

Some vehicles include multiple prime movers which may be selectively operated to motivate a vehicle. For example, a hybrid vehicle may include an internal combustion engine and an electric motor/generator that may each be selectively operated to adapt to various demands and conditions. The prime movers may selectively apply torque to drive members via a driveline.

One example of a hybrid vehicle is disclosed in, commonly assigned, U.S. Pat. No. 6,953,409, which is incorporated herein by reference in its entirety. The hybrid vehicle includes a propulsion system which includes an engine, a first motor/generator, and a second motor/generator which are each coupled to a transmission. The particular propulsion disclosed in that patent is capable of transmitting power to the vehicle in an extremely wide range of applications.

Other examples of hybrid vehicle propulsion systems are disclosed in commonly assigned U.S. Pat. Nos. 7,577,507, 7,739,016, and 8,010,263, each of which is hereby incorporated in its entirety herein. Exemplary propulsion systems disclosed in these patents also include an engine, a first motor/generator, and a second motor/generator that are selectively operated and controlled to adapt to varying demands and conditions. For example, U.S. Pat. No. 8,010,263 discloses a control system for a hybrid propulsion system to provide active driveline damping. To provide this capability, the driveline is represented by a multiple mass-spring model having multiple degrees of freedom and multiple torque control devices. The dynamic response of the speed of each independent mass and the torque of each spring in the system is modeled. A desired trajectory for each spring and torque is computed and the actual speed and torques are compared to their respective desired trajectories. The vector of trajectory errors is multiplied by a matrix of feedback gains to form coordinated commands to selective torque generating devices. As such the entire dynamic trajectory of each component in the driveline may be controlled.

FIG. 1 illustrates one exemplary schematic representation of a model propulsion system 100 that may be represented by differential state equations in a control system. The model includes an engine 102 connected to a torque transfer device 104. The torque transfer device 104 is connected to a first planetary gear set 106. The first planetary gear set 106 is connected to a first motor/generator 108. The first motor/generator 108 is coupled to a second planetary gear set 110. The second planetary gear set 110 is coupled to a second motor/generator 112. The second motor/generator 112 is coupled to a third planetary gear set 114. The third planetary gear set 114 is coupled to final drive 116 which is coupled to a drive member 118 (such as, for example, a wheel) and the vehicle mass 120. An estimator in a control system operates using differential state equations representing the model of FIG. 1 to provide estimates for the speed and inertia of each component represented by the model. One of those estimated values is a wheel speed estimate which may be compared to a measured wheel speed (which may include an average of measured wheel speeds) and the error between the wheel speed estimate and the measured wheel speed may be used to back calculate a corrective torque that may be commanded to one or more of the motor/generators 108 and/or 112 which may dampen dynamic oscillations in a propulsion system.

In other exemplary embodiments, a similar model propulsion system 100 may be further or alternatively used to compensate for driveline lash and clunk (see, for example, U.S. Pat. No. 7,577,507) and/or to compensate for driveline oscillations which may improve operation of clutches and other components within the driveline. For example, through the use of the estimator based upon the model, speeds of components of a clutch may be synchronized to ensure proper operation and reduce the opportunity for failure and/or damage to a clutch component.

An exemplary estimator which may be used by these control system is disclosed and described in U.S. Pat. No. 7,739,016. As explained above, the estimator/model is used to provide an estimated value for the speed of each independent mass device and the torque or each spring device in the system. The model of FIG. 1 includes twelve separate and independent masses, each indicated by a numbered and shaded circle, along with at least two springs. One spring between the final drive 116 and drive member 118 and another spring between the drive member 118 and the mass of the vehicle 120. The estimator operates using a plurality of linear equations that are based upon the mathematical model. This estimator may be executed within a controller.

SUMMARY

Vehicles may have propulsion systems that are coupled to more than one drive member. Each drive member may be driven through separate propulsion systems and may be coupled to separate and independently operated prime movers. For example, a vehicle may have an all-wheel drive system in which one or more wheels are driven. In contrast, as explained above, conventional systems rely upon a model of a propulsion system which only includes a single drive member. Therefore, this model is not sufficient for vehicles having more than one drive member.

One possible solution to accommodate a vehicle having more than one drive member, would be to simply provide a control system which relies upon two propulsion system models, one for each drive member. There are at least two problems with such an alternative.

The first problem is that the conventional model only includes a single drive member. This does not reflect what is actually occurring in the physical world. For example, an engine may provide torque to a front axle and a separate and independent motor/generator may provide a torque to a rear axle. If each of these separate propulsion systems include their own independent control systems, a conflict may arise. For example, if only the engine in the front propulsion system is operating to apply torque to a drive member, the speed of the drive member on the second propulsion system will change even though no torque is being applied by the second propulsion system. This would result in an incorrect estimate of the speed of the drive member in that second propulsion system and incorrect control of that system would result. This is true because the road surface on which the vehicle travels effectively couples the two drive members to each other.

Another possibility is to provide a model for the overall vehicle which simply provides a model propulsion system 100 for each of the driven members and to model a coupling between those two models. In this manner, mathematically, it is possible to control both propulsion systems using two coupled sets of models 100. However, the complexity of such a system is enormous. As explained above, each model is represented by a set of linear equations having coefficients that are stored in a matrix. For each modelled propulsion system, for example, an eight by eight matrix may be required which requires 64 separate calibration values. There is another matrix for the input and another for the outputs. In total, processing and storage is required for at least eleven inputs and eight states, so that is 88 coefficients. Further, a set for each mode of operation for such a propulsion system is required. In such an exemplary system, there may be 32 different modes of operation. Thus, requiring 88 coefficients times 32, for each propulsion system.

So, if to accommodate two separate driven members, a separate propulsion system model is used for each driven member used, a four-fold increase in the parameters and values must be processed and stored. Processing capacity is not infinite and can be expensive. Additionally, each of these values must be calibrated which can significantly adversely increase the workload required to generate those calibrated values.

Additionally, the inventor realized that the complexity of such a system may quickly become unwieldy. Calibration tools are typically developed for each corresponding propulsion system which enables the generation of calibration values using a process of learning and testing. Simultaneously, the vehicle may be further developed and modified. Each modification may affect the driveline dynamics which requires a calibrator to adjust the parameters of the tool that is used to generate the calibrated values and the whole process may need to be repeated and adjusted until the vehicle operates with the desired characteristics.

Further, while it is possible to use the conventional single wheel speed estimate models to represent the speed of multiple wheels using a lumped vehicle mass, such a model would not provide accurate predictions because each wheel or drive member may have different tractive efforts that correspondingly effect the speeds of each of those drive members.

In contrast, with these alternatives, the inventor created an elegant solution which solves these and other problems and which also provides the ability to control a propulsion system having multiple drive propulsion systems such that, for example, driveline vibrations are reduced and/or eliminated, driveline lash may be reduced and/or eliminated, components within the propulsion system may be operated without failure or damage and the like.

In an exemplary aspect, a vehicle includes a first propulsion system that includes a first torque generator, a first transmission in communication with the first torque generator, and a first drive member in communication with the first transmission, a second propulsion system that includes a second torque generator, a second transmission in communication with the second torque generator, and a second drive member in communication with the second transmission, a first speed sensor that measures a speed of the first drive member, and a controller. The controller is programmed to estimate a speed of the first drive member based upon a model of the first propulsion system that includes a modeled first rotational inertia and a modeled first translational inertia that are rigidly connected to each other and a model of a first coupling between the modeled first propulsion system and a model of the second propulsion system, compare the estimated speed of the first drive member to the measured speed of the first drive member, and control the first propulsion system based upon the comparison.

In another exemplary aspect, the modeled first translational inertia includes a model of the translational inertia of a portion of the mass of the vehicle.

In another exemplary aspect, the portion of the mass of the vehicle includes one half of the mass of the vehicle.

In another exemplary aspect, the model of the first coupling includes a model of a slip coupling between the modeled first propulsion system and the modeled second propulsion system.

In another exemplary aspect, the first torque generator includes a first electric motor and wherein the controller controls the first propulsion system by controlling a torque of the first electric motor.

In another exemplary aspect, the first torque generator includes a first brake and wherein the controller controls the first propulsion system by controlling the first brake.

In another exemplary aspect, the controller controls the first propulsion system to dampen oscillations within the first propulsion system.

In another exemplary aspect, the model of the second propulsion system includes a modeled second rotational inertia and a modeled second translational inertia that are rigidly connected to each other.

In another exemplary aspect, controller is further programmed to estimate a speed of the second drive member based upon the model of the second propulsion system that includes a modeled second rotational inertia and a modeled second translational inertia.

In this manner, control over a vehicle propulsion system having multiple propulsion systems is greatly simplified, complexity is reduced, calibration workload is reduced, processing and component cost is minimized.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 2:
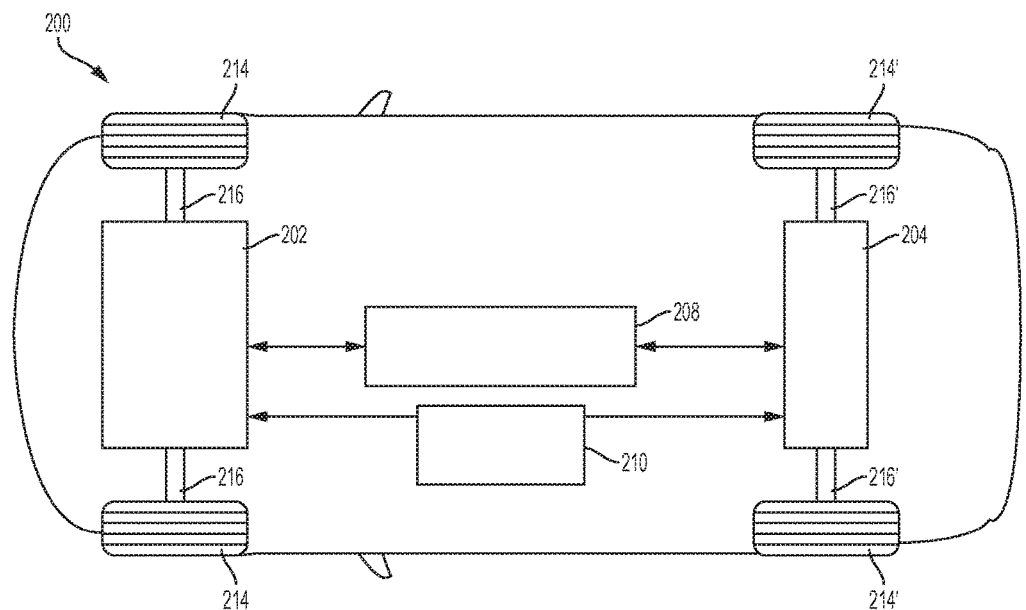
FIG. 2 is a schematic diagram of an exemplary vehicle in accordance with an exemplary embodiment of the present disclosure.

FIG. 2 illustrates a block, schematic diagram of an exemplary vehicle 200 that includes a front propulsion system 202, a rear propulsion system 204, propulsion system controller 208 and a power storage 210. Each of the propulsion systems 202 and 204 are coupled to drive axles 216 (and 216') which, in turn, are coupled to drive members 214 (and 214') such as, for example, drive wheels. The front propulsion system 202 may include any number of prime movers (not illustrated) such as, for example, one or more engines and/or motor/generators. Similarly, the rear propulsion system may also include any number of prime movers (not illustrated). Such a vehicle may be referred to as having all wheel drive (AWD) and/or electronic all-wheel drive (eAWD). It will be appreciated that the present invention encompasses any vehicle configuration involving more than one, separate and independent driven member, whether it be a combination front wheel and rear wheel drive as illustrated in FIG. 2 or any other possible combination of multiple drive member configurations in the vehicle without limitation.

Figure 3:
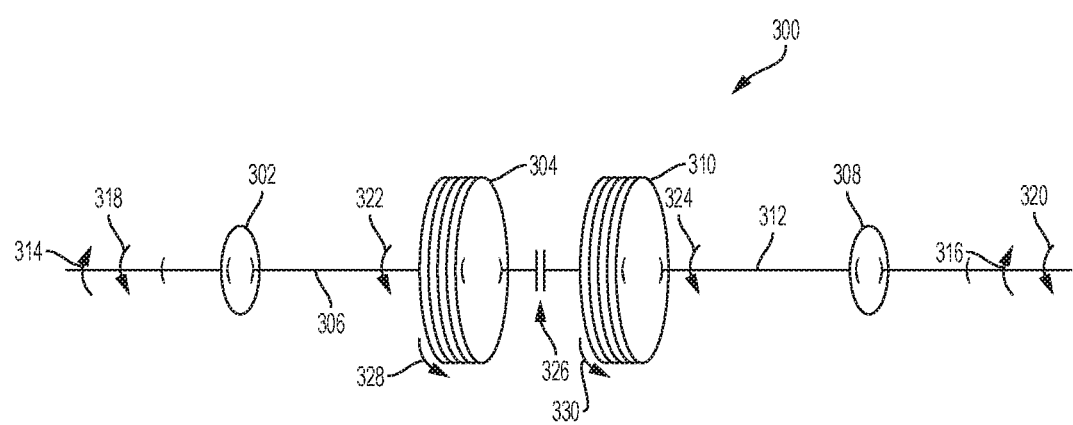
FIG. 3 is a composite schematic diagram of an exemplary vehicle propulsion system model for a control system in accordance with an exemplary embodiment of the present disclosure.
Figure 4:
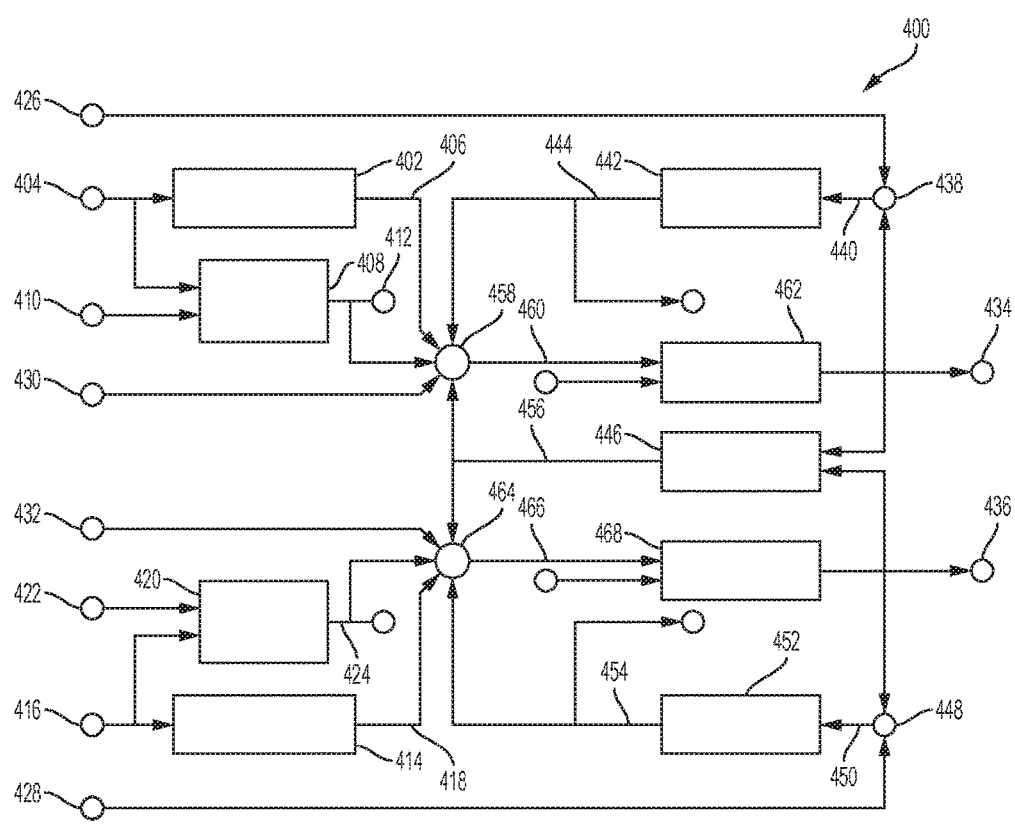
FIG. 4 is a schematic diagram of an implementation model 400 for a control system in accordance with an exemplary embodiment of the present disclosure.

FIG. 3 is a composite illustration of an exemplary schematic model 300 that is helpful for understanding with additional reference to an exemplary control system 400 that is illustrated in FIG. 4. The model 300 provides guidance for deriving a set of linear equations to estimate a plurality of driven wheel speeds against which measured driven wheel speeds may be compared. The model 300 includes a first rotational inertia 302 and a first translational inertia 304 that are connected to each other by a rigid axle 306. These first components 302, 304, and 306 may correspond to, for example, a front propulsion system 202 and front drive member 214. The first rotational inertia 302 represents the rotational inertia that is reflected to a first drive member, such as, for example, a front drive member 214. The first translational inertia 304 represents, for example, the translational inertia corresponding to one half of the mass of vehicle 200 that is reflected to the first drive member, such as, for example, front drive member 214.

Similarly, the schematic model 300 further includes a second set of components that may correspond to, for example, a second propulsion system 204 and rear driven wheels 214' of FIG. 2. This second set of components include a second rotational inertia 308 and a second translational inertia 310 that are connected to each other by a rigid axle 312. The second rotational inertia 308 represents the rotational inertia that is reflected to a second drive member, such as, for example, a rear drive member 214'. The second translational inertia 310 represents, for example, the translational inertia corresponding to one half of the mass of vehicle 200 that is reflected to the second drive member, such as, for example, front drive member 214'.

The schematic model 300 further includes a coupling 326 that represents the coupling between a first drive member and a second drive member, such as, for example, the coupling between the front drive member 214 and the rear drive member 214' resulting from the coupling between the surface across which the vehicle 200 is traveling and each drive member 214 and 214'. For example, the road surface across which a front driven wheel travels couples that front driven wheel to a rear driven wheel in a vehicle. The coupling 326 schematically represents the coupling between the first axle 306 and the second axle 312 (and corresponding driven members). The coupling 326 may correspond to the slip required to generate traction as the vehicle is driven by varying torques being applied to the different driven wheels. For example, there may be an instance where an engine in a front propulsion system applies a torque to a front wheel of a vehicle while no torque is applied by a rear propulsion system. The front wheel will be rotating at a speed that is slightly higher than the vehicle. This speed difference is known as slip and is required for traction. In contrast, the rear wheel connected to a rear propulsion system will be rotating at the same speed as the vehicle. This difference of rotational speed is accommodated by the model 300 with the coupling 326.

The schematic model 300 further illustrates the effect of various torques upon the model. A first axle torque 314 and a second axle torque 316 may correspond to a torque or torques being applied by one or more prime movers within respective propulsion systems, such as, for example, an internal combustion engine, an electric motor, and/or the like without limitation (not shown). A first brake torque 318 and a second brake torque 320 acting in an opposite direction from the first axle torque 314 and second axle torque 316 may also have an effect. Additionally, a first compensating torque 322 and a second compensating torque 324. These torques 322 and 324 may correspond to an applied corrective torque which is commanded to, for example, a motor within a corresponding propulsion system to, for example, dampen oscillations.

Lastly, the model 300 illustrates the effect of torques applied to the system from the road across which the vehicle may be travelling. An example of such a torque may be known to those of skill in the art as a "road load" torque. The model 300 includes a first road load torque 328 and a second road load torque 330.

Figure 1:
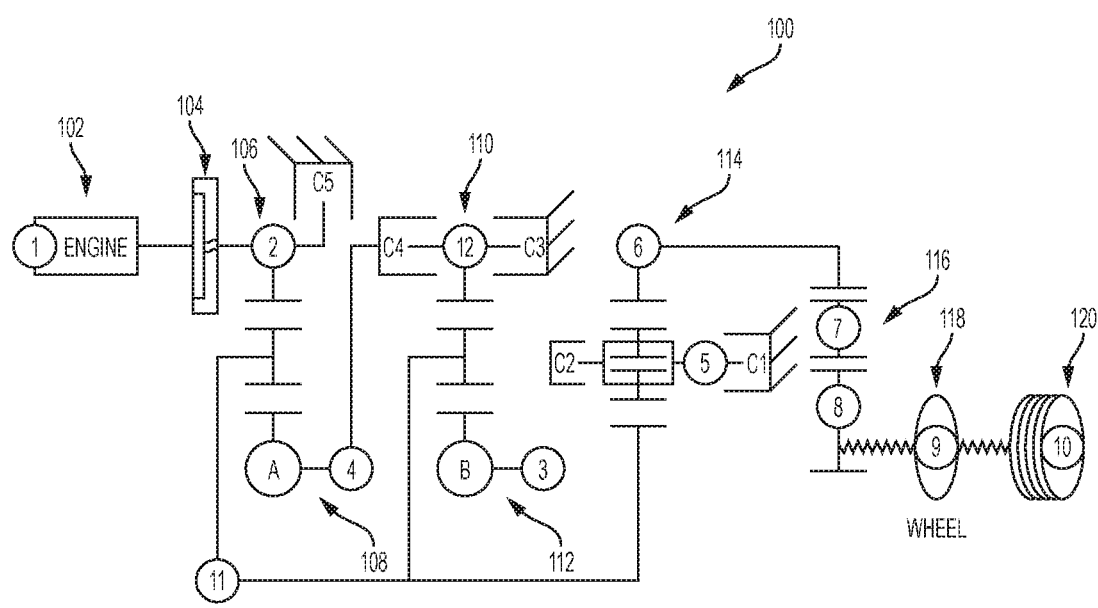
FIG. 1 is a schematic representation of a model of a propulsion system.

In contrast with the conventional model 100 of FIG. 1, where the wheel 118 is distinguished from the vehicle 120, and all components of the propulsion system are modeled requiring 12 different mass nodes with all of their spring rates and connections between them to be accounted for, the present model 300 greatly simplifies things with only a single rigid connection between the rotational and translational inertias on each side of the model 300. The model 300 does not distinguish between the wheel and the vehicle. Rather, model 300 includes only single rigid axle corresponding to each propulsion system/drive member, which lumps the wheel and vehicle together, and recognizes only the differences between the rotational and translational inertia components. An equation representing one half of this model 300 may be a simple first order equation because the only output is the estimate of the wheel speeds from each side of the model 300.

In general, people who are trained to model systems are trained to generate a model based upon the real, exact physical structure. This conventional way of thinking led to the prior model 100 illustrated by FIG. 1. In contrast, the model 300 models split masses when in reality, there are not masses split from each other. With this realization by the inventor, the model does not need to match the exact physical characteristics of the system being controlled. Rather, the model 300 only estimates and then tracks the wheel speeds and does not need to track or estimate the conditions of the multiple components of the actual physical system.

Referring now to FIG. 4, a schematic illustration of an implementation model 400 for a control system in accordance with the present invention is described. The implementation model 400 illustrates exemplary modules within a control system which each process input signals and generate output signals based upon a set of linear and/or non-linear equations derived with reference to the exemplary model 300 of FIG. 3.

The implementation model 400 includes a first road load estimator 402 that receives a first wheel speed estimate from a previous iteration 404. The first road load estimator 402 generates a signal representing an estimated torque 406 that may be attributed to a first road load. The first road load estimator 402 generates a signal representing a first estimated torque 406 that may be attributed to a first road load. The effect of that first road load estimate is schematically illustrated as first road load torque 328 in FIG. 3. The first road load estimator 402 may output an estimated torque 406 using the following exemplary equation:

$$TE = \text{sign}(PWSE1) \times RT + PWSE1 \times V\text{Term} + \text{sign}(PWSE1) \times (PWSE1)^2 \times V2\text{Term}$$

Where TE is the torque estimate, PWSE1 is the previous first wheel speed estimate, VTerm is a coefficient for road load torque proportional to vehicle speed and V2Term is a coefficient for road load torque proportional to the square of vehicle speed. Both VTerm and V2Term are determined experimentally from standard vehicle coast down testing.

The implementation model 400 further includes a first brake torque estimator 408. The first brake torque estimator 408 receives the previous first wheel speed estimate 404 and a first brake torque 410 to generate a first brake torque estimate 412. The first brake torque 410 corresponds to the first brake torque 318 in FIG. 3. The first brake torque estimator 408 outputs a first brake torque estimate, BTE1 using the following equation:

$$BTE1 = \text{sign}(PWSE1) \times CBT$$

Where CBT is the commanded brake torque.

Similarly, the implementation model 400 further includes a second road load estimator 414 that receives a second wheel speed estimate from a previous iteration 416. The second road load estimator 414 generates a signal representing a second road load torque estimate 418. The effect of that first road load estimate is schematically illustrated as second road load torque 330 in FIG. 3.

The implementation model 400 further includes a second brake torque estimator 420. The second brake torque estimator 420 receives the previous second wheel speed estimate 416 and a second brake torque 422 to generate a second brake torque estimate 424. The second brake torque 422 corresponds to the second brake torque 320 in FIG. 3.

The implementation model 400 receives as input a first wheel speed signal 426 and a second wheel speed signal 428. Each of these signals is derived from actual wheel speed measurements and are used as reference signals against which driveline control may be reliably performed as is described herein. It is understood that the measured wheel speed signals 426 and 428 may be filtered as is understood by those skilled in the art. The implementation model also generates a first estimated wheel speed 434 and a second estimated wheel speed 436, which will be explained in more detail below.

The implementation model includes a first wheel speed comparator 438 that receives the first estimated wheel speed 434 and the first wheel speed signal 426 and outputs a first wheel speed estimate error signal 440. The first wheel speed estimate error signal 440 is received by a first compensator 442 which generates a first torque compensation signal 444. That first torque compensation signal 444 may correspond to the first compensating torque 322 illustrated in FIG. 3. The first compensator 442 may generate a first compensating torque signal, CTS1 based upon the following equation:

$$ES1 = ES1 + WSE1 \times IG1$$

$$CTS1 = ES1 + WSE1 \times PG1$$

Where ES1 is an error sum for the first wheel speed, WSE1 is the first wheel speed error from the comparator 438, IG1 is the integral gain for the first axle, and PG1 is the proportional gain for the first axle.

Similarly, the implementation model includes a second wheel speed comparator 448 that receives the second estimated wheel speed 436 and the second wheel speed signal 428 and outputs a second wheel speed estimate error signal 450 in a manner similar to the first wheel speed comparator 438. The second wheel speed estimate error signal 450 is received by a second compensator 452 which generates a second torque compensation signal 454. That second torque compensation signal 454 may correspond to the second compensating torque 324 illustrated in FIG. 3.

The implementation model 400 further includes a coupling module 446 that receives the first estimated wheel speed 434 and the second estimated wheel speed 436 and generates a coupling torque signal 456. The coupling torque signal 456 represents the torque transfer between the two axles 306 and 312 as a result of the coupling 326 between the two axles. As explained above, the coupling 326 accounts for the torque transfer between two separate driven wheels through a road surface across which the vehicle is traveling. The coupling module 446 may generate a coupling torque, CT 456 using the following equation:

$$CT = f(100 \times (WSE1 - WSE2)/abs(WSE1))$$

Where CT is the coupling torque, WSE1 is the first wheel speed estimate, and WSE2 is the second wheel speed estimate.

The implementation model 400 also receives as input a first axle torque 430 and a second axle torque 432. These torque signals may correspond to the axle torque being applied to each of the first axle 306 and second axle 312 in the model 300 from a corresponding prime mover in each of a corresponding propulsion system.

The implementation model 400 includes a first torque summer 458 that receives the multiple torque input signals representing all of the modeled torques being applied to the first axle 306 and outputs a first resultant torque 460. In this exemplary embodiment the first torque summer 458 receives the first estimated torque signal 406 from the first road load estimator 402, the first brake torque estimate signal 412 from the first brake torque estimator 408, the first axle torque 430, and the first torque compensation signal 444 and determines the sum of all of these torques and outputs the first resultant torque 460. This first resultant torque 460 is the total accumulation of all torque being applied to the first axle 306. The implementation model 400 includes a first wheel speed estimator 462 that receives the first resultant torque signal 460 and a range state signal that indicates the gear ratios that are used to calculate the connected inertia and generates the first wheel speed estimate signal 434. The first wheel speed estimator 462 may generate the first wheel speed estimate 434 using the following equations:

$$WSE1 = WSE1 + DT \times TE1/I1$$

Where WSE1 is the first wheel speed estimate, DT is the time between calculations, TE1 is the first torque estimate and I1 is the first inertia which, as explained above, is a function of the range state signal.

Similarly, the implementation model 400 includes a second torque summer 464 that receives the multiple torque input signals representing all of the modeled torques being applied to the second axle 312 and outputs a second resultant torque 466. In this exemplary embodiment the second torque summer 464 receives the second estimated torque signal 418 from the second road load estimator 414, the second brake torque estimate signal 424 from the second brake torque estimator 420, the second axle torque 432, and the second torque compensation signal 454 and determines the sum of all of these torques and outputs the second resultant torque 466. This second resultant torque 466 is the total accumulation of all modeled torque being applied to the second axle 312. The implementation model 400 includes a second wheel speed estimator 468 that receives the second resultant torque signal 466 a range state signal that indicates the gear ratios that are used to calculate the connected inertia and generates the second wheel speed estimate signal 436.

Although the above exemplary embodiments describe a control system for a vehicle having two propulsion systems and/or two corresponding driven wheels, those of ordinary skill in the art understand that the invention is amenable for use with a vehicle having any number of propulsion systems and/or driven wheels.

Further, while the above exemplary embodiments are describe for use in association with dampening driveline oscillations, it is to be understood that the present control system may be used for many other purposes such as, for example torque control, speed control for clutch synchronization, lash management, and the like without limitation.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle comprising:
    a first propulsion system that includes a first torque generator, a first transmission in communication with the first torque generator, and a first drive member in communication with the first transmission;
    a second propulsion system that includes a second torque generator, a second transmission in communication with the second torque generator, and a second drive member in communication with the second transmission;
    a first speed sensor that measures a speed of the first drive member; and
    a controller programmed to:
        estimate a speed of the first drive member using at least one linear equation that models the first propulsion system with coefficients corresponding to a first rotational inertia and a first translational inertia and a first coupling between the first propulsion system and the second propulsion system;
        compare the estimated speed of the first drive member to the measured speed of the first drive member;
        determining an estimated speed error signal based upon the comparison; and
        control the torque generated by the first propulsion system based upon the estimated speed error signal.

2. The vehicle of claim 1, wherein the first translational inertia comprises a translational inertia of a portion of a mass of the vehicle.

3. The vehicle of claim 2, wherein the portion of the mass of the vehicle comprises one half of the mass of the vehicle.

4. The vehicle of claim 1, wherein the model of the first coupling comprises a model of a slip coupling between the modeled first propulsion system and the modeled second propulsion system.

5. The vehicle of claim 1, wherein the first torque generator comprises a first electric motor and wherein the controller controls the first propulsion system by controlling a torque of the first electric motor.

6. The vehicle of claim 1, wherein the first torque generator comprises a first brake and wherein the controller controls the first propulsion system by controlling the first brake.

7. The vehicle of claim 1, wherein controlling the first propulsion system dampens oscillations within the first propulsion system.

8. The vehicle of claim 1, wherein the model of the second propulsion system includes a modeled second rotational inertia and a modeled second translational inertia that are rigidly connected to each other.

9. The vehicle of claim 1, wherein the controller is further programmed to estimate a speed of the second drive member based upon the model of the second propulsion system that includes a modeled second rotational inertia and a modeled second translational inertia.

10. A method for controlling a vehicle that includes a first propulsion system with a first torque generator and coupled to a first drive member, a second propulsion system with a second torque generator and coupled to a second drive member, the method comprising:
    measuring a speed of the first drive member;
    estimating a speed of the first drive member using at least one linear equation that models the first propulsion system with coefficients corresponding to a first rotational inertia and a first translational inertia and a first coupling between the first propulsion system and the second propulsion system;
    comparing the measured speed of the first drive member to the estimated speed of the first drive member;
    determining an estimated speed error signal based upon the comparison; and
    controlling the torque generated by the first propulsion system based upon the estimated speed error signal.

11. The method of claim 10, wherein the first translational inertia comprises a translational inertia of a portion of a mass of the vehicle.

12. The method of claim 11, wherein the portion of the mass of the vehicle comprises one half of the mass of the vehicle.

13. The method of claim 10, wherein the model of the first coupling comprises a model of a slip coupling between the modeled first propulsion system and the modeled second propulsion system.

14. The method of claim 10, wherein the first torque generator comprises a first electric motor and wherein controlling the first propulsion system comprises controlling a torque of the first electric motor.

15. The method of claim 10, wherein the first torque generator comprises a first brake and wherein controlling the first propulsion system comprises controlling the first brake.

16. The method of claim 10, wherein controlling the first propulsion system dampens oscillations within the first propulsion system.

17. The method of claim 10, wherein the model of the second propulsion system includes a modeled second rotational inertia and a modeled second translational inertia that are rigidly connected to each other.

18. The method of claim 10, further comprising:
measuring a speed of the second drive member;
estimating a speed of the second drive member using at least one linear equation that models the second propulsion system with coefficients corresponding to a second rotational inertia and a second translational inertia and the first coupling between the first propulsion system and the second propulsion system; and
comparing the measured speed of the second drive member to the estimated speed of the second drive member;
determining a second estimated speed error signal based upon the comparison; and
controlling the torque generated by the second propulsion system based upon the second estimated speed error signal.

* * * * *